Patented Sept. 20, 1932

1,877,960

UNITED STATES PATENT OFFICE

HARRY C. PEFFER AND PAUL W. JONES, OF LAFAYETTE, INDIANA, ASSIGNORS TO ROSTONE, INCORPORATED, OF LAFAYETTE, INDIANA, A CORPORATION OF INDIANA

STRUCTURAL MATERIAL AND PROCESS OF MAKING THE SAME

No Drawing.    Application filed September 22, 1930.   Serial No. 483,748.

This invention is an improvement upon the process and material set forth in the application of Peffer, Harrison and Ross filed February 18, 1929, Serial No. 341,030 which has become Patent 1,852,672, such process producing a material called "rostone".

As described in that application the essential raw materials are (a) a mineral substance, such as slate, shale, and certain clays composed wholly or in part of aluminosilicic acid; (b) lime, magnesia, or other alkaline earth base; and (c) water as an essential reacting agent. In producing "rostone" the alkaline earth base and finely ground mineral are mixed with sufficient water to ensure complete reaction and then so heated as will, without destroying the essential water content of the mass, transform the mass by reaction into a product possessing high compressive and tensile strength and resistant to attack by ordinary chemical reagents. Such a mixture is then subjected to heat, in presence of water vapor, to cause the desired reaction between the base, aluminosilicic acid and water, and produce the desired product; or such mixture can be indurated with steam at substantially atmospheric pressure until the mass is transformed into the desired material. The optimum amount of water necessary in the mass for producing the desired reaction is approximately 25% (based on the dry weight of the solid constituents) as set forth in said application.

The reaction of the components and the induration of the mass may be facilitated by subjecting the finely ground and pulverized raw materials, before the addition of water thereto, to the action of steam at approximately 212° F. to pre-temper the same, and such pretreatment insures more rapid and quick absorption or taking up of the proper amount of water essential for chemical reaction when the water is added to the pretreated material. When the finely ground pulverized material is thus pre-tempered, sufficient essential water necessary for insuring the subsequent chemical reaction is added.

The material produced by the aforesaid process is termed "rostone" and we have discovered that the addition of fibrous materials to the mixture as above set forth in some manner improves the plasticity and working qualities of the mass and results in a finished product of improved toughness and weathering qualities not explainable by the mere mechanical action of the fibrous materials. We employ both mineral and vegetable fibres, as the latter are not injured by the low temperatures employed. We have used both asbestos and vegetable fibres such as insulite and celotex successfully in this process; and in the manufacture of an acoustic tile vegetable fibres may be used.

In carrying out our process we preferably intimately mix the alkalyine earth base, aluminosilicic acid material and fibres; then add the optimum amount of water and thoroughly mix the mass; and then indurate the mass in the manner that "rostone" is indurated, the resultant product being a structural material resembling stone and comprising fibres intimately incorporated in the material, the product being a substantially homogeneous material having fibres dispersed throughout its mass.

We have used both asbestos and vegetable fibers such as insulite and celotex successfully in this process; and for the manufacture of an acoustic tile, a vegetable fiber will probably produce superior results.

As an example, one practical formula which can be used in producing a structural material embodying our invention is as follows:

22 parts of base material
100 parts of aluminosilicic acid
5 parts of mineral fibres (asbestos)
22 parts of water Before induration the fibrous mass may be molded or otherwise formed into suitable shapes, as in ordinary ceramic practice, and then indurated or hardened as set forth in the aforesaid applications.

We claim:—

1. The process of producing an artificial structural material; consisting in mixing an alkaline earth base, a finely ground mineral material containing hydrated aluminosilicic acid, fibrous material, and water in optimum quantity to produce complete reaction; and heating the mass while retaining its essential water content until it is transformed into the desired material.

2. The process of producing an artificial structural material; consisting in mixing an alkaline earth base, a finely ground material composed principally of hydrated aluminosilicic acid, fibrous material, and water; in proportions to produce a material possessing high compressive and tensile strength and subjecting the mass to heat in presence of water vapor to prevent evaporation of essential reacting water until the mass is transformed into the desired material.

3. The herein described process of producing an artificial structural material possessing high compressive and tensile strength and having a binding medium resistant to attack by ordinary chemical reagents; consisting in mixing an alkaline earth base selected from a group consisting of lime and magnesia, a finely ground material composed principally of hydrated aluminosilicic acid, fibrous material, and water; and subjecting the mass to heat while retaining the essential reacting water therein until the mass is transformed into said material.

4. The herein described process of producing an artificial structural material; consisting in mixing an alkaline earth base a finely ground material composed principally of hydrated aluminosilicic acid, and fibrous material; adding water; and finally subjecting the mass to heat until it is transformed into the desired material.

5. The herein described process of producing an artificial structural material; consisting in mixing an alkaline earth base, a finely ground material composed principally of hydrated aluminosilicic acid and a fibrous material; and then adding sufficient water to cause complete reaction and subjecting the mass to heat in presence of water vapor to prevent evaporation of essential reacting water until the mass is transformed into the desired material.

6. The herein described artifical structural material possessing high compressive and tensile strength provided by mixing an alkaline earth base, a finely ground mineral material containing hydrated aluminosilicic acid, fibrous material and water in optimum quantity to produce complete reaction; and heating the mass while retaining its essential water content until it is transformed into the desired product.

7. The herein described artificial structural material possessing high compressive and tensile strength, produced by mixing an alkaline earth base, a finely ground material composed principally of hydrated aluminosilicic acid, fibrous material and water, and subjecting the mass to heat in presence of water vapor to prevent evaporation of essential reacting water until the mass is transformed into the desired material.

8. The herein described artificial structural material possessing high compressive and tensile strength and having a binding medium resistant to attack by ordinary chemical reagents; produced by mixing an alkaline earth base selected from a group consisting of lime and magnesia, a finely ground material composed principally of hydrated aluminosilicic acid, fibrous material, and water, and subjecting the mass to heat while retaining the essential reacting water until the mass is transformed into said material.

9. The herein described artificial structural material possessing high compressive and tensile strength produced by mixing an alkaline earth base selected from a group consisting of lime and magnesia, a finely ground material composed principally of hydrated aluminosilicic acid, a fibrous material, and water in proportions to produce the material, and subjecting the mass to heat in presence of water vapor to prevent evaporation of essential reacting water until the mass is transformed.

10. The herein described artificial structural material; produced by mixing an alkaline earth base, a finely ground material composed principally of hydrated aluminosilicic acid, and a fibrous material; adding water in optimum quantity to produce complete reaction; and then subjecting the mass to heat until the mass is transformed into the desired material.

11. The herein described artificial structural material possessing high compressive and tensile strength and having a binding medium resistant to attack by ordinary chemical reagents; produced by mixing an alkaline earth base selected from a group consisting of lime and magnesia, a finely ground material composed principally of hydrated aluminosilicic acid, and fibrous material; adding water to the mixture; and finally subjecting the mass to heat and retaining the essential reacting water until the mass is transformed into said material.

12. The herein described artificial structural material resistant to ordinary chemical reagents; produced by mixing an alkaline earth base, a finely ground mineral material containing hydrated aluminosilicic acid, and fibrous material; adding thereto sufficient water to cause complete reaction, and finally indurating the mass with steam at substantially atmospheric pressure until the mass is transformed into the said material.

HARRY C. PEFFER.
PAUL W. JONES.